No. 772,725. PATENTED OCT. 18, 1904.
A. H. LEWIS.
JOURNAL BOX.
APPLICATION FILED AUG. 9, 1904.
NO MODEL.
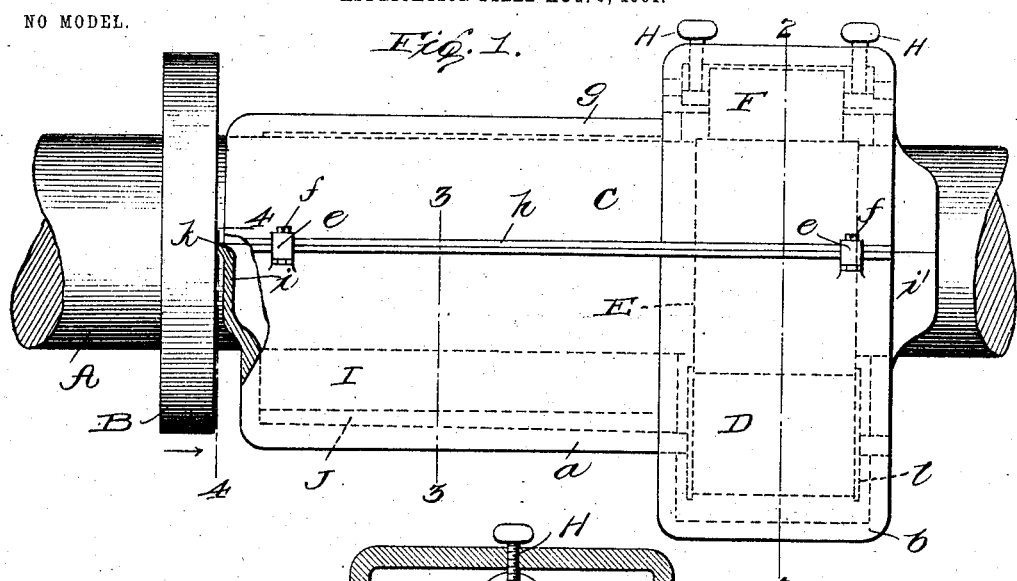
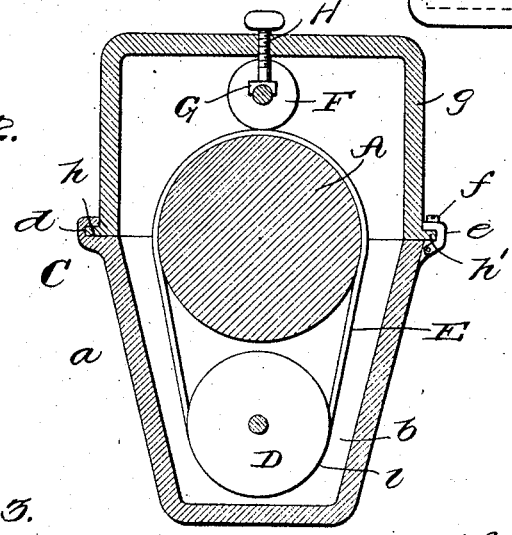
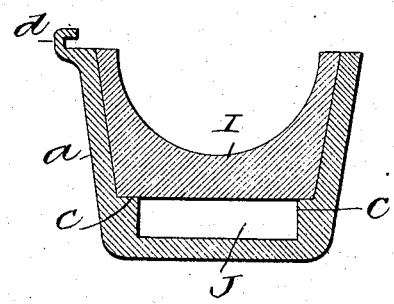
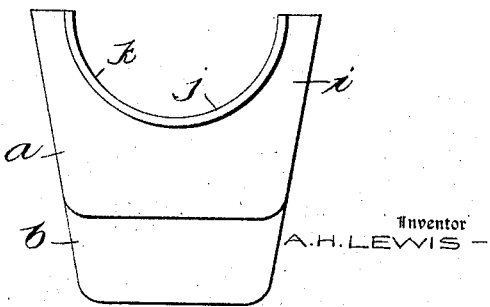
Witnesses
Inventor
A. H. LEWIS
Attorney No. 772,725.                                                                 Patented October 18, 1904.

UNITED STATES PATENT OFFICE.

ALBERT H. LEWIS, OF UHRICHSVILLE, OHIO, ASSIGNOR OF ELEVEN-TWENTIETHS TO ALBERT H. TIPTON, OF UHRICHSVILLE, OHIO, AND HARRY CLUTZ, OF MIDVALE, OHIO.

JOURNAL-BOX.

SPECIFICATION forming part of Letters Patent No. 772,725, dated October 18, 1904.

Application filed August 9, 1904. Serial No. 220,121. (No model.)

*To all whom it may concern:*

Be it known that I, ALBERT H. LEWIS, a citizen of the United States, residing at Uhrichsville, in the county of Tuscarawas and State of Ohio, have invented new and useful Improvements in Journal-Boxes, of which the following is a specification.

My invention pertains to the type of journal-boxes that are constructed with a view of lubricating shafts and axles; and it consists in the peculiar and advantageous journal-box hereinafter described, and particularly pointed out in the claims appended.

In the accompanying drawings, forming part of this specification, Figure is a side elevation of my novel journal-box in its proper position relative to a shaft or axle. Fig. 2 is a transverse section taken in the plane indicated by the line 2 2 of Fig. 1. Fig. 3 is a transverse section taken in the plane indicated by the line 3 3 of Fig. 1, and Fig. 4 is a transverse section taken in the plane indicated by the line 4 4 of Fig. 1 looking in the direction indicated by the arrow.

Similar letters designate corresponding parts in all of the views of the drawings, referring to which—

A is a shaft or axle carrying a wheel B, which may be either a traveling wheel or a band-pulley, and C is the casing of my improved journal-box. The said casing is made up of a lower section $a$ of channel form in cross-section, Fig. 3, having a comparatively deep portion $b$ at one end, Fig. 2, and also having interior ledges $c$, angular lugs $d$, and hinged lugs $e$, bearing set-screws $f$, and an upper section $g$, having a flange $h$, designed to rest under the lugs $d$ of the lower section $a$, and a flange $h'$, designed to be engaged by the lugs $e$ and the set-screws $f$ of said lower section $a$.

In virtue of the construction described there is no liability of the upper section $g$ being casually displaced, and yet said section may be readily removed when it is desired to place lubricant in the comparatively deep portion $b$ of the section $a$. The upper casing-section $g$ preferably extends to the face of the wheel B, while the lower casing-section $a$ has one of its ends disposed adjacent to the said side of the wheel, Fig. 1. At its said end the lower casing-section is equipped with a lip $i$, which is recessed, as indicated by $j$, to snugly receive the shaft, and is provided with a scraper $k$. The scraper $k$ is designed to remove lubricant from the shaft A, while the lip $i$ has for its purpose to conduct the lubricant so removed to the lower casing-section $a$, with a view of preventing escape of the lubricant from the box.

The lower casing-section $a$ is further provided with a lip $i'$, recessed similar to the lip $i$, to receive the shaft A. Said lip $i'$ is located at the opposite end of the section $a$ with reference to the lip $i$ and is designed to conduct excess lubricant from the shaft into said lower section.

In addition to the casing C the novel journal-box comprises a drum D, mounted in the portion $b$ of casing-section $a$ and having flanges $l$; a belt E, of suitable porous material, arranged on the drum D, between the flanges $l$, which serve to hold the belt against lateral displacement, and also arranged on the shaft or axle A; a roller F, preferably of rubber, arranged above the belt E and having trunnions journaled and movable vertically in the upper casing-section $g$; blocks G, bearing on the said trunnions; screws H, journaled in said casing-section $g$ and bearing at their lower ends on the blocks G and having for their purpose to hold the roller F under pressure against the belt E as the latter passes over the shaft, so as to press lubricant from the belt and assure thorough lubrication of the shaft; a bearing-block I, of Babbitt metal or other suitable material, arranged in the lower casing-section $a$ and on the ledges $c$ thereof, and a chamber J, located below said bearing-block and pitched or inclined downwardly toward the portion $b$ of section $a$ and having for its purpose to conduct the lubricant received from the lip $i$ to said portion $b$.

In the practical operation of my novel journal-box it will be observed that the belt E, which is moved by the shaft A, serves to convey lubricant from the portion *b* of the casing-section *a* up to the shaft A and that by reason of this and the pressure-roller F thorough lubrication of the shaft at all times is assured. It will also be observed that such lubricant as finds its way to the wheel B will be taken off the wheel by the scraper *k* and lip *i*, received in the lower casing-section *a*, and conveyed by the latter back to the portion *b* ready to be again taken up by the belt E.

When desirable, suitable filtering material M may be placed in the chamber J with a view of removing foreign substance from the lubricant precedent to the return of the latter to the casing portion *b*.

It will be appreciated from the foregoing that while my novel journal-box is highly efficient for the purpose ascribed to it it is simple and inexpensive in construction and embodies no delicate parts such as are likely to get out of order after a short period of use.

I have entered into a detailed description of the construction and relative arrangement of the parts embraced in the present and preferred embodiment of my invention in order to impart a full, clear, and exact understanding of the said embodiment. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. In a journal-box, the combination of a shaft bearing a wheel, a casing having a comparatively deep portion at one end, and also having a scraper at its opposite end resting against the side of the wheel and means for conveying lubricant from the scraper to its lower portion, a drum mounted in the comparatively deep portion of the casing, a belt passing around said drum and the shaft, and means for pressing lubricant from the belt to assure thorough lubrication of the shaft.

2. In a journal-box, the combination of a shaft bearing a wheel, a casing having interior ledges, and also having a comparatively deep portion at one end, a scraper at its opposite end resting against the side of the wheel, a chamber inclined downwardly toward the comparatively deep portion, and a lip for conveying lubricant from the scraper to said chamber, a bearing-block arranged on the ledges of the casing and above said chamber, a drum mounted in the comparatively deep portion of the casing, a belt passing around said drum and the shaft, and means for pressing lubricant from the belt so as to assure thorough lubrication of the shaft.

3. In a journal-box, the combination of a shaft bearing a wheel, a casing comprising a lower section having a comparatively deep portion at one end, a scraper at its opposite end resting against the side of the wheel and means for conveying lubricant from the scraper to its lower portion, and also having fixed lugs at one side and hinged lugs at its opposite side bearing set-screws, and an upper section resting on the lower section, and having flanges designed to be engaged by the lugs and set-screws of said lower section, a drum mounted in the comparatively deep portion of the lower casing-section, a belt passing around said drum and the shaft, a roller mounted in the upper casing-section, and means for holding said roller under pressure against the belt.

4. In a journal-box, the combination of a shaft bearing a wheel, a casing having a comparatively deep portion at one end, and a lip on said portion notched to receive the shaft, and also having a scraper at its opposite end resting against the side of the wheel and means for conveying lubricant from the scraper to its lower portion, a drum mounted in the comparatively deep portion of the casing, a belt passing around said drum and the shaft, and means for pressing lubricant from the belt to assure thorough lubrication of the shaft.

In testimony whereof I have hereunto set my hand in presence of two subscribing witnesses.

ALBERT H. LEWIS.

Witnesses:
H. J. ELSON,
J. M. ELSON.